United States Patent Office 3,846,265
Patented Nov. 5, 1974

3,846,265
PRODUCTION OF SHAPED STRUCTURES
Yasuju Yamaguchi and Yujiro Nakayama, Yokkaichi, Japan, assignors to Mitsubishi Petrochemical Company, Limited, Tokyo-to, Japan
No Drawing. Filed Dec. 14, 1970, Ser. No. 98,091
Claims priority, application Japan, Dec. 24, 1969, 44/103,451
Int. Cl. C08f 29/50; C08b 21/08; B29f 1/08
U.S. Cl. 204—159.12
11 Claims

ABSTRACT OF THE DISCLOSURE

A particulate cellulosic material (e.g., small wood flakes, chips, and shavings) of a particle size larger than 10 mesh (Tyler sieve) is impregnated with at least one vinyl monomer and irradiated with radiation rays to cause graft copolymerization, and the product resulting from this reaction is formed under heat and pressure into a board or plate material having highly desirable properties including high bending elasticity and high impact strength.

BACKGROUND OF THE INVENTION

This invention relates generally to fabrication of shaped structures and more particularly to the production of new and advanced shaped structures containing particulate cellulosic substances. According to a specific embodiment of the invention, there are provided new shaped structures having the desirable characteristics of wood.

The process of impregnating cellulosic high-polymer substances, particularly woods, with a vinyl monomer and polymerizing the monomer within the woods thereby to produce a product in each case wherein the wood and a plastics in the form of a polymer formed from the vinyl monomer are in strictly integral state or in a combined state, that is, a "wood-plastics composite material," is known.

Conventional wood-plastics composite materials of this character are generally made with the use of wood structures such as boards and long pieces which are self-supporting, whereby these materials, themselves, can be used directly as various structural materials and surface-finishing materials.

SUMMARY OF THE INVENTION

It is an object of the present invention to produce new shaped or fabricated structures by applying the technique of fabricating the above mentioned composite materials to cellulosic high-polymer substances, or cellulosic materials, in particulate form, such as wood powder, which, themselves, are not of a self-supporting nature thereby to provide new shaped structures.

According to the present invention, briefly summarized, there is provided a process for producing shaped structures which comprises impregnating a particulate, cellulosic high-polymer substance of a particle size larger than 10 mesh, Tyler standard sieve, with a vinyl monomer, causing graft copolymerization of the vinyl monomer, and subjecting the resulting reaction product to pressure and/or heat thereby to fabricate a shaped structure.

According to the present invention in another aspect thereof, there is provided a process in which the resulting graft-copolymerization product prepared in the above described manner is subjected to pressure and/or heat in the presence of a vinyl monomer or a partial polymer thereof.

The nature, details, and utility of the invention will be more clearly apparent from the following detailed description beginning with general aspects and features of the invention and concluding with specific examples of practice illustrating preferred embodiments of the invention.

DETAILED DESCRIPTION

The cellulosic high-polymer substances in particulate form to be used in accordance with the invention are of relatively large particle size. More specifically, examples of these substances are wood chips, bamboo chips, straws, peanut shells, bagasse chips, and small paper pieces, which may be respectively used independently or used in the form of mixtures to constitute a basic starting material according to the invention.

These substances are of a particle size such that the individual particles thereof have a minimum size of 10 mesh by the Tyler standard sieve rating. The upper limit of the particle size is 2 mm. in thickness for chip-shaped particles. The moisture contents of these substances are adjusted in a manner to suit each case in a range, for example, of from 0 to 15 percent by weight.

The most typically representative example of a cellulosic high-polymer substance in particulate form is the material referred to as wood chips, with respect to which the invention will be described hereinbelow.

The basic starting materials in the production of formed structures according to this invention are at least one particulate, cellulosic high-polymer substance (hereinafter referred to as wood chips) and at least one vinyl monomer. According to this invention these basic materials are mixed and subjected to graft copolymerization conditions.

The vinyl monomer, in general, is in liquid state under the graft copolymerization conditions, and the graft copolymerization proceeds with the monomer in impregnated state in the wood chips. Almost any kind of vinyl monomer, including vinylidene monomer, can be used according to this invention. Specific examples of suitable vinyl monomers are: alkenyl aromatic compounds, particularly styrene and nucleus- and/or side-chain-substituted derivatives thereof as, for example, $\alpha$-methylstyrene, vinyltoluenes, and chlorostyrenes; vinyl halides such as vinyl chloride; vinylidene halides such as vinylidene chloride; acrylic acid esters, particularly lower alkyl esters; methacrylic acid esters, particularly lower alkyl esters; acrylonitrile; methacrylonitrile; vinyl esters such as vinyl acetate; and mixtures of two or more of these monomers.

These vinyl monomers can be caused, in the state of solutions, to impregnate wood chips. By using an alcohol (e.g., a lower alkanol) or an ether (e.g., a lower alkyl-ether or cyclic ether) as the solvent in this case, a pronounced improvement in the reaction efficiency can be expected in the case of radiation graft copolymerization.

We have found that a suitable quantity of the vinyl monomer for use according to this invention is in the range of from 2 to 70 percent, preferably from 10 to 30 percent by weight of the quantity of wood chips.

While the above-mentioned graft copolymerization may be accomplished by any known method, it is preferably carried out by irradiation of reactants with radiation rays. While almost any kind of radiation rays can be used, gamma-rays obtainable from isotopes such as cobalt 60 and beta-rays obtainable from electron-beam accelerators are probably the most convenient and effective in most instances. By adding to the vinyl monomer a compound having a catalytic action such as azo-bis-isobutyronitrile and peroxides, it is possible to reduce the required quantity of irradiation.

During graft copolymerization, particularly during a so-called simultaneous irradiation graft copolymerization process, polymers of the vinyl monomer are frequently formed as a by-product. This occurs in many cases also in the practice of this invention, but the presence of such polymers is not a deleterious result. Rather, it may be said to be a desirable result. The reason for this is that these polymers act as adhesives at the time of structure shaping described hereinafter.

In one preferred embodiment of the invention, various auxiliary ingredients which are to be present in the final shaped structure, such as a combustion-inhibiting agent, a rot-proofing agent for the wood chips, an insect-proofing and termite-proofing agent, and an agent for improving impact resistance, are added in the graft copolymerization process step. When these auxiliary ingredients are caused to be present under the graft copolymerization conditions, there is the possibility of these ingredients combining chemically with the wood material or the polymers formed from the vinyl monomer, which would not occur in the case where these ingredients are merely added physically in the shaping process step, whereby the purposes of these auxiliary ingredients are fulfilled in a more positive and effective manner.

Specific examples of the more important of these auxiliary ingredients are as follows.

(I). Combustion-inhibiting agents.
  (a). A monomer for forming an inorganic high-polymer material or phosphorus and/or a halogen-containing organic compound. For example, a siloxane compound (e.g., a cyclic siloxane), a borazol compound (e.g., aminoborazol), a phosphonitrile compound (e.g., phosphonitrile chloride), a phosphate compound (e.g., alkyldiaryl phosphate and triphenyl phosphate), and hydrocarbon halides (e.g., polyphenyl chloride and tetrabromoethane).
  (b). Inorganic powder compound. For example, inorganic acids and salts thereof (e.g., boric acid, silicic acid, sodium phosphate, titanium dioxide, and antimony oxide), phosphorus and/or a halide (e.g., antimony trichloride and calcium chloride), a fatty acid metal salt (e.g., lead stearate and aluminum stearate), and clay minerals (e.g., talc, silica, clays, sellatie (belonesite), and kaolin).
(II). Rot-proofing agents. For example, organic tin compounds such as bis (tributyltin) oxide and others.
(III). Insect-proof, termite-proof agents. For example, organic mercury compounds, gamma-benzene hexachloride, and others.
(IV). Agents for improving impact resistance. For example, polyethylene glycols and esters thereof (e.g., diethylene glycol dibenzoate), phthalic acid esters (e.g., dimethyl phthalate and dioctyl phthalate), aliphatic dibasic acid diesters (e.g., dioctyl adipate and dibutyl sebacate), fatty acid esters (butyl oleate and methyl acetylricinoleate), phosphoric acid esters (trioctyl phosphate and tricresyl phosphate), and chlorinated paraffin.
(V). Agents for imparting strong mutual cohesion action between wood chips, plastics formed, and inorganic substances during forming. For example, diacetone acrylamide (e.g., N-(1,1-dimethyl-3-oxabutyl) acrylamide and N-methylol acrylamide).

These additives may be added in quantties to suit each instance. One example in terms of percentages by weight with respect to the total weight of the wood chips and vinyl monomer is: at most 25 percent, preferably from 10 to 20 percent of above compound (I); at most 0.5 percent, preferably from 0.05 to 0.1 percent of compound (II); at most 1 percent, preferably from 0.2 to 0.3 percent of compound (III); from 1 to 20 percent, preferably from 5 to 10 percent of compound (IV); and at most 15 percent, preferably from 5 to 10 percent of compound (V).

These compounds can be used in the form of mixtures of two or more thereof selected from the same group or from different groups. For example, when compounds (a) and (b) of the group (I) compounds are to be used together, one of these compounds is added in a quantity of at least 1 percent.

The substance obtained after the graft copolymerization is, in general, either in the form of chips or in the form of lumps which readily assume the form of chips when subjected to a slight impact. While a substance of this character can be used directly as a material for fabricating shaped structures, auxiliary ingredients, such as the aforedescribed various agents, coloring matter, and a stabilizer, can be combined specially or additionally to this substance when necessary. Furthermore, this substance can be milled or crushed to a desired particle size.

A shaping material prepared in the above described manner is subjected to heat and/or pressure to fabricate it into a shaped structure or article. The heat and pressure thus applied must, of course, be of magnitudes sufficient for causing the plastics within the shaping material to fuse together into an integral structure. An example of suitable fabrication conditions are a range of temperature of from 160 to 190° C. and a range of pressure of from 10 to 50 kg./cm.$^2$.

In one specific example of preferred embodiment of the invention, the fabrication of the shaped articles is carried out in the presence of a vinyl monomer or a partial polymer thereof. By this mode of fabrication, the adhesion between the wood chips is remarkably improved, whereby it is possible to produce shaped structures of excellent mechanical properties.

While a suitable vinyl monomer can be selected from the group enumerated hereinbefore for use as the vinyl monomer in this case, it is generally preferable to use the same kind of vinyl monomer as that caused to undergo graft copolymerization in the wood chips. For a partial polymer of a vinyl monomer, an oligomer of low degree of polymerization (for example, an oligomer of a molecular weight of the order of 1,000 or less) or a so-called "syrup" which is in an intermediate stage of polymerization can be used.

The quantity in which this vinyl monomer or partial polymer thereof is used is, in general, at least 1 percent, preferably from 2 to 3 percent, by weight of the weight of the graft-copolymerized wood chips. It is also possible to use a polymerization catalyst for promoting the polymerization of this vinyl monomer or partial polymer thereof.

In order to indicate still more fully the nature and utility of this invention, the following specific examples of practice constituting preferred embodiments of the invention and results are set forth, it being understood that these examples are presented as illustrative only, and that they are not intended to limit the scope of the invention.

EXAMPLE 1

(1). A pine wood was rendered into small flakes of a moisture content less than 10 percent. These flakes were placed in an enclosed vessel, which, after evacuation, was charged with a specific quantity of a treatment liquid consisting of a solution formed by mixing methanol and a vinyl monomer with a ratio of 1:4. After from 1 to 5 minutes of steeping of the wood chips, irradiation of the process batch was carried out with a dose of 1 megarad by means of Cobalt-60 of 1,500 curies thereby to cause graft copolymerization.

The resulting reaction substance was dried, and the graft rate (GR) and the reaction rate (RR) thereof, as defined below, were measured. The results for samples prepared with respectively different vinyl monomers and different quantities thereof are indicated in Table 1.

$$GR = \frac{Q_1 - A}{A} \times 100,$$

where:

$Q_1$ is the quantity of the substances formed in the reaction; and $A$ is the quantity of particulate cellulosic substances.

$$RR = \frac{Q_2}{Q_3} \times 100,$$

where:

$Q_2$ is the quantity of treatment liquid which reacted; and
$Q_3$ is the quantity of treatment liquid caused to impregnate the wood chips.

(2). Next, each graft copolymer thus prepared was fabricated into a plate material of 5-mm. thickness under the shaping conditions of a temperature of 180° C., pressure of 50 kg./cm.², and time of 20 minutes by means of a 150-ton (metric) compression press. The result plate specimens were subjected to various tests, whereupon the results set forth in Table 1 were obtained.

TABLE 1

| Experiment number | Vinyl monomer kind | Graft rate (percent) | Physical properties of shaped structure | | | | |
|---|---|---|---|---|---|---|---|
| | | | Specific gravity | Bending strength (kg./cm.²) | Bending modulus of elasticity (kg./cm.²) | Impact strength (kg.-cm./cm.²) | Water absorption (wt.4 percent) |
| 1 | Styrene | 5 | 0.86 | 549 | 42,000 | 4.69 | 83 |
| 2 | do | 20 | 0.77 | 744 | 50,700 | 5.73 | 67 |
| 3 | do | 50 | 1.13 | 814 | 63,600 | 4.41 | 25 |
| 4 | Methyl methacrylate | 5 | 0.88 | 610 | 45,000 | 3.80 | 87 |
| 5 | do | 20 | 0.98 | 790 | 53,000 | 3.90 | 18 |
| 6 | do | 30 | 1.15 | 875 | 65,800 | 4.10 | 84 |
| 7 | Acrylonitrile | 30 | 0.98 | 780 | 52,500 | 3.85 | 15 |
| 8 | Methyl acrylate | 20 | 0.96 | 720 | 30,200 | 8.00 | 21 |
| 9 | Vinylidene chloride | 7 | 0.92 | 520 | 35,000 | 6.80 | 62 |
| 10 | Vinyl chloride | 21 | 0.97 | 450 | 47,000 | 6.20 | 13 |

The physical properties set forth in Table 1 and other tables are the results of testing by the following test methods.

Bending strength (g./cm.²)
 Testing machine: Instron tester.
 Specimen size: 80 x 10 x 5 mm.
 Loading speed: 0.01 $L^2/6\,d$ (mm./min.)
where
 L is distance between supports
 d is specimen thickness
 d—64 mm.
Bending modulus of elasticity (kg./cm.²)
 Testing machine: Instron tester
 Testing conditions: same as above (ASTM, D790)
Impact strength (kg.-cm./cm.²)
 Testing machine: Charpy
 Specimen size 80 x 10 x 2 mm. (3 pieces) Notch: 45°V., 3-mm. depth.
 Hammer swing, upper angle: 135°. (ASTM, D256)
Water absorption (weight percent)
 Test conditions: immersion for 24 hours in water at 23° C. (ASTM, D570)

EXAMPLE 2

(1). Bamboo was rendered into small flakes (average length 20 mm., width 3 mm., thickness 0.5 mm.) of a moisture content below 10 percent. These flakes were placed in an enclosed vessel, which, after evacuation, was charged with a specific quantity of a solution formed by mixing methanol and styrene with a ratio of 1:5. The process batch was left standing for a period of from 3 to 7 minutes to cause the solution to flow into and diffuse in the bamboo flakes. The resulting batch was then irradiated with a dose of 5 megarads of radiation by means of an electron-beam accelerator (linear accelerator of 4-Mev., 0.7-kw. rating) and thereby caused to undergo graft copolymerization.

(2). The graft copolymer thus prepared was fabricated into a plate material of 5-mm. thickness under the same shaping conditions as set forth in Example 1.

The plate material thus fabricated was tested in the same manner as in Example 1, whereupon the results set forth in Table 2 were obtained.

TABLE 2

| Experiment number | Physical properties of shaped structure | | | | |
|---|---|---|---|---|---|
| | Graft rate (percent) | Specific gravity | Bending strength (kg./cm.²) | Bending modulus of elasticity (kg./cm.²) | Impact strength (kg.-cm./cm.²) | Water absorption (percent) |
| 11 | 5 | 0.91 | 580 | 43,500 | 5.01 | 72 |
| 12 | 20 | 0.98 | 760 | 52,800 | 5.10 | 19 |
| 13 | 50 | 1.16 | 832 | 63,800 | 5.80 | 11 |

EXAMPLE 3

(1). The wood of a deciduous tree was rendered into small flakes (average length of 20 mm., width of 3 mm., and thickness of 0.2 mm.), the moisture content of which was adjusted to approximately 8 percent, and air contained in the flakes was thoroughly removed. To these flakes, a specific quantity of a solution formed by mixing dioxane and styrene with a ratio of 1:6 was added. After the resulting process materials were left standing for a period of from 3 to 6 minutes to permit the solution to flow into and diffuse in the interior of the flakes, the process materials were subjected to irradiation with a dose of 6.5 megarads by means of an electron-beam accelerator (linear accelerator of 4-Mev. and 0.7-kw. rating) and thereby caused to undergo graft copolymerization.

(2). To the graft copolymer thus prepared, 2.2 percent (with respect to the graft copolymer quantity) of a solution formed by mixing styrene and a styrene oligomer with a mixture ratio of 1:3, and the resulting mixture was agitated thoroughly. The resulting process materials were then fabricated into a plate material of 5-mm. thickness under the conditions of a temperature of 183° C., pressure of 50 kg./cm.²., and time of 20 minutes by means of a 150-ton (metric) compression press.

Various physical properties of the plate material were measured similarly as in the preceding examples.

The results of tests on various specimens prepared in the above described manner with varying quantities of added vinyl monomer are shown in Table 3.

TABLE 3

| Experiment number | Physical properties of shaped structure | | | | |
|---|---|---|---|---|---|
| | Graft rate (percent) | Specific gravity | Bending strength (kg./cm.²) | Bending modulus of elasticity (kg./cm.²) | Impact strength (kg.-cm./cm.²) |
| 14 | 2 | 0.71 | | 12,000 | |
| 15 | 2 | 0.75 | 530 | 43,500 | 4.30 |
| 16 | 5 | 0.87 | 570 | 50,200 | 4.80 |
| 17 | 10 | 0.92 | 681 | 52,800 | 4.70 |

EXAMPLE 4

(1). A graft copolymer was prepared by the procedure set forth in Example 3 except for the use of methyl methacrylate for the monomer.

(2). With respect to the graft copolymer thus obtained, 25 percent of a methyl methacrylate oligomer was added, and the resulting mixture was thoroughly agitated. Then, by the same procedure as that specified in Example 3, a plate material of 5-mm. thickness was fabricated and subjected to the physical property tests described above.

The results of these tests with test specimens of plate materials prepared with different graft rates are shown in Table 4.

TABLE 4

| Experiment number | Graft rate (percent) | Physical properties of shaped structure | | | |
|---|---|---|---|---|---|
| | | Specific gravity | Bending strength (kg./cm.²) | Bending modulus of elasticity (kg./cm.²) | Impact strength (kg.-cm./cm.²) |
| 18 | 2 | 0.76 | 535 | 45,000 | 4.65 |
| 19 | 5 | 0.89 | 620 | 52,500 | 4.80 |
| 20 | 20 | 0.99 | 880 | 60,700 | 4.70 |

NOTE.—Monomer: Methyl methacrylate.

EXAMPLE 5

With respect to the weight of a graft polymer prepared by procedure of Example for Experiment No. 16, 2 percent of dibutyl phthalate was added, and the resulting mixture was thoroughly agitated. The resulting mixture was then fabricated into a plate material of 5-mm. thickness under the conditions of a temperature of 185° C., pressure of 50 kg./cm.², and time of 20 minutes by means of a 150-ton compression press.

The plate material thus fabricated was found to have a bending modulus of elasticity of 48,500 kg./cm.² and an impact strength of 7.3 kg.-cm./cm.². This impact strength is a great improvement over that of the material of Experiment 16.

EXAMPLE 6

(1) Small flakes (average length 25 mm., width 3 mm., and thickness 0.3 mm.) of a coniferous tree and a deciduous tree was mixed with a ratio of 1:1, and the moisture content thereof was adjusted to a value below 12 percent. The flakes were then placed in an enclosed vessel, which was evacuated to lower further the moisture content of the flakes to approximately 8 percent and, at the same time, to remove thoroughly air contained in the flakes.

A treatment liquid was prepared by adding, to a solution of methanol and styrene mixed with a ratio of 1:5, azo-bis-isobutylnitrile in a quantity corresponding to 0.3 percent of that of the solution. This treatment liquid was sprayed in the form of the fine droplets onto the flakes in a quantity such that the proportion of the styrene was 20 percent relative to flakes. The flakes thus coated were left for a number of minutes to permit the treatment liquid to flow and diffuse within the flakes.

Next, the process materials were irradiated with Cobalt-60 rays of 1,500 curies, whereupon, with a dose of 0.7 megarads, the monomer used underwent 100-percent graft copolymerization, and a graft polymer of a graft rate of 20 percent was obtained.

(2) The process material thus prepared was fabricated in accordance with the procedure of Example 3 into a plate material, which was tested and found to have a bending modulus of elasticity of 57,100 kg./cm.² and an impact strength of 4.85 kg.-cm./cm.².

EXAMPLE 7

(1) Small flakes of "surgi" wood (Cryptomeria japonica) with a moisture content of approximately 15 percent were prepared and placed in an enclosed stainless-steel vessel, which was then evacuated to adjust the moisture content of the flakes to approximately 10 percent. A treatment liquid consisting of a mixture solvent of 40 parts of styrene, 40 parts of methyl methacrylate, 15 parts of methanol, 4 parts of tetrahydrophosphate chloride, and 1 part of tributyltin oxide was prepared and added to the flakes in a quantity of 30 percent by weight with respect to the flakes. In a period of from 5 to 6 minutes, the treatment liquid penetrated and diffused fully into the voids within the flakes.

The flakes thus impregnated with the treatment liquid was irradiated with a dose of 1 megarad at a dose rate of $1\times 10^4$ rad/hour of Cobalt-60 rays of 1,500 curies.

This irradiation was carried out in the atmosphere, and graft copolymerization was accomplished as the temperature at the center of the sample was adjusted to a value of from 60 to 80° C.

After the irradiation, the flakes were left standing for 30 minutes in a hot-air-treatment chamber at 75° C. to complete the polymerization, and the graft rate and the reaction rate were determined.

(2) With respect to 80 parts of the graft polymer thus prepared, 10 parts of kaolin, 5 parts of talcum powder, 3 parts of aluminum hydroxide, and 2 parts of an oligomer prepared by suitably polymerizing methyl methacrylate were added, and the resulting mixture was thoroughly agitated and mixed.

The resulting process materials were then fabricated into a plate material of 5-mm. thickness under the shaping conditions of a temperature of 191° C., pressure of 45 kg./cm.², and compression time of 2 minutes by means of a 150-ton, hot-compression press.

The plate material thus fabricated was tested and found to have the following properties.

Graft rate: 29.3%
Reaction rate: 100%
Combustibility [1]: difficult, Class 2b (Measured physical properties)
Specific gravity: 1.04
Bending modulus of elasticity: 65,000 kg./cm.²
Impact strength: 5.13 kg.-cm./cm.²
Water absorption: 15 wt. percent

[1] Japan Industrial Standards, JIS A 1321 (propane-gas burner).

EXAMPLE 8

(1) The moisture content of small flakes of the wood of a coniferous tree was adjusted to approximately 15 percent. The flakes were then placed in an enclosed stainless-steel vessel, which was then evacuated to lower the moisture content of the flakes further to approximately 10 percent.

Separately, a treatment liquid consisting of a mixture solution of 30 parts of vinyl acetate, 37 parts of methyl methacrylate, 20 parts of methanol, 5 parts of diethyl chlorophosphate, 5 parts of paraffin chloride, and 3 parts of vinylidene bromide was prepared. This treatment liquid was added to the flakes in a quantity of 20 percent by weight with respect to the flakes, and the resulting process materials were left standing for a period of from 3 to 4 minutes to permit the liquid to flow and diffuse within the flakes.

100 parts of the flakes thus impregnated with the treatment liquid, 15 parts of kaolin, and 2 parts of boric acid powder were thoroughly mixed, and the resulting mixture was irradiated with a dose of 6.6 megarads of beta-rays by means of an electron-beam accelerator, whereupon a graft copolymer was obtained.

(2) To 100 parts of this graft copolymer, 1.5 parts of dibutyl phthalate and 1 part of a vinyl oligomer were added. The resulting mixture was then formed into a plate material of 5-mm. thickness under the shaping conditions of a temperature of 188 degrees C., pressure of 48 kg./cm.², and time of 20 minutes by means of a 150-ton, hot-compression press. The plate material thus fabricated was tested and found to have the following properties.

Graft rate: 11.7%
Reaction rate: 94%
Combustibility: difficult, class 2b (Measured physical properties)
Specific gravity: 0.91
Bending modulus of elasticity: 47,300 kg./cm.²
Impact strength: 6.07 kg.-cm./cm.²
Water absorption: 77.0 wt. percent

EXAMPLE 9

To 100 parts of the graft copolymer prepared by the procedure specified in Example 8, 3 parts of polyethylene glycol of a molecular weight of 800 was added, and the resulting mixture was formed into a board or plate material by hot compression under the shaping conditions set forth in Example 8. The results of tests on this plate material are shown in Table 5.

EXAMPLE 10

To 100 parts of the graft copolymer prepared by the procedudre specified in Example 8, 5 parts of methanol and 1 part of N-methylolacrylamide were added, and the resulting mixture was mixed thoroughly and formed into a plate material by hot compression under the shaping conditions set forth in Example 8. The results of tests on this plate material are shown in Table 5.

TABLE 5

| Experiment number | Physical properties of shaped structure | | |
|---|---|---|---|
| | Specific gravity | Bending modulus of elasticity (kg./cm.$^2$) | Impact strength (kg.-cm./cm.$^2$) |
| 25 | 0.94 | 40,200 | 7.07 |
| 26 | 0.93 | 52,000, | 7.50 |

EXAMPLE 11

(1) Wheat straw was cut into small pieces, which were placed in an enclosed stainless-steel vessel. The vessel was then evacuated, and the moisture content of the straw pieces was adjusted to approximately 10 percent. The straw pieces were then impregnated with 20 percent by weight (with respect to the straw pieces) of a treatment liquid consisting of a mixture solution of 20 parts of styrene, 30 parts of methyl methacrylate, 10 parts of vinylidene chloride, 17 parts of dioxane, 10 parts of butyl methacrylate, 29 parts of phosphonitrile chloride, and 0.1 percent of benzoyl peroxide. The straw pieces thus impregnated were left standing for 4 to 5 minutes to permit the treatment liquid to flow into and diffuse uniformly in the straw pieces.

To 100 parts of the resulting impregnated straw pieces, 12 parts of talcum powder were added, and, after thorough mixing, the resulting mixture was subjected to a total irradiation dose of 0.6 megarads by cobalt-60 rays of 1,500 curies (dose rate $1 \times 10^4$ rads/hour), whereupon a graft copolymer was obtained.

(2) With 100 parts of the graft copolymer thus obtained, 3 parts of dioxane and 1 part of polyethylene glycol were thoroughly blended. The resulting mixture was used with asbestos (10 parts of the asbestos with respect to 90 parts of the graft copolymer) to form a plate material of 5-mm. thickness wherein the asbestos was sandwiched in the center, this plate material being formed by means of a 150-ton, hot-compression press under the shaping conditions of a temperature of 180° C., pressure of 45 kg./cm.$^2$, and time of 21 minutes. The plate material thus produced was tested and found to have the following properties.

Graft rate: 25.6%
Reaction rate: 100%
Combustibility: difficult, class 1b (Measured physical properties)
Specific gravity: 1.23
Bending modulus of elasticity: 33,600 kg./cm.$^2$
Impact strength: 5.06 kg.-cm./cm.$^2$
Water absorption: 10.3 wt. %

EXAMPLE 12

(1) Waste paper was steeped in a 3-percent alcohol solution of N-methylolacrylamide and was then air dried and rendered into a pulp-form material, the moisture content of which was reduced to approximately 13 percent. The material was then placed in an enclosed stainless-steel vessel, which was evacuated to adjust the moisture content of the pulp-form material to 10 percent.

A treatment liquid prepared separately by mixing 40 parts of styrene, 40 parts of methyl methacrylate, and 20 parts of methanol (in a quantity of 20 percent by weight relative to the waste paper) was sprayed uniformly onto the pulp-form material, whereupon this liquid rapidly penetrated into the pulp-form material.

With 100 parts of the pulp-form material thus impregnated, 3 parts of boric acid, 5 parts of talcum powder, and 2 parts of a plasticizer (adipic acid ester) were thoroughly blended. The resulting process material was then subjected to irradiation with a total dose of 7.0 megarads at a dose rate of $2 \times 10^5$ rads/sec. by means of an electron beam, whereupon a graft copolymer was obtained.

(2) To 100 parts of this graft copolymer, 2 parts of a methyl methacrylate oligomer was added. Then 95 parts of the resulting mixture was used to sandwich 5 parts of glass fibers therewithin to form a laminated mass, which was fabricated into a plate material of 5-mm. thickness by means of a 150-ton hot-compression press under the shaping conditions of a temperature of 180 degrees C., pressure of 40 kg./cm.$^2$, and compression time of 20 minutes. This plate material was found to have the following properties.

Graft rate: 20.5%
Reaction rate:: 100%
Combustibility: difficult, class 3b (Measured physical properties)
Specific gravity: 0.91
Bending modulus of elasticity: 48,200 kg./cm.$^2$
Impact strength:: 6.87 kg.-cm./cm.$^2$
Water absorption: 29 wt. %

What is claimed is:

1. A process for producing shaped structures which comprises impregnating a loose particulate, cellulosic high-polymer substance of a size larger than 10 mesh, Tyler standard sieve, with 2 to 70% by weight based on said cellulosic high-polymer substance of at least one vinyl monomer, subjecting the resulting loose particular mass consisting essentially of said particulate, cellulosic high-polymer substance impregnated with said vinyl monomer to radiation induced graft polymerization thereby to cause said vinyl monomer to graft-copolymerize onto the particulate, cellulosic high-polymer substance, and then subjecting the resulting reaction product which is still substantially loose and particulate to compression molding under heat and pressure sufficient to fuse the particulate reaction product into a coherent mass whereby the reaction product is formed into a shaped structure.

2. A process for producing shaped structures according to claim 1 in which said resulting reaction product is subjected to pressure of 10 to 50 kg./cm. and heat at a temperature of about 160 to 190° C., to form the thus graft-polymerized particular product, into a shaped structure.

3. A process for producing shaped structures as claimed in claim 2 in which said resulting reaction product is subjected to pressure and heat in the presence of a member selected from the group consisting of vinyl monomers and partial polymers thereof.

4. A process for producing shaped structures according to claim 1 in which said particulate, cellulosic high-polymer substance is wood chips.

5. A process for producing shaped structures according to claim 1 in which said at least one vinyl monomer is a member selected from the group consisting of alkenyl aromatic compounds, vinyl halides, vinylidene halides, acrylic acid esters, methacrylic acid esters, acrylonitrile, methacrylonitrile, vinyl esters, and mixtures of at least two of these monomers.

6. A process for producing shaped structures according to claim 3 in which said at least one vinyl monomer is a member selected from the group consisting of alkenyl aromatic compounds, vinyl halides, vinylidene halides, acrylic acid esters, methacrylic acid esters, acrylonitrile, methacrylonitrile, vinyl esters, and mixtures of at least two of these monomers.

7. A process for producing shaped structures according to claim 1 in which said graft copolymerization is caused by irradiation of the monomer with radiation rays selected from gamma and beta rays.

8. A process for producing shaped structures according to claim 3 in which said graft copolymerization is caused by irradiation of the monomer with radiation rays selected from gamma and beta rays.

9. A process according to claim 4 in which said wood chips have a maximum thickness of about 2 mm.

10. A process according to claim 1 in which the amount of said vinyl monomer impregnated in said cellulosic substance is about 10–30% by weight based on the weight of said cellulosic substance.

11. A process according to claim 3 in which said monomer or partial polymer is present in an amount of about 1 to 3% by weight based on the weight of the thus graft-copolymerized reaction product.

References Cited

UNITED STATES PATENTS

| | | | |
|---|---|---|---|
| 3,549,509 | 12/1970 | Casalina | 204—159.12 |
| 3,077,418 | 2/1963 | Kenaya | 204—159.12 |
| 3,077,419 | 2/1963 | Kenaya | 204—159.12 |
| 3,077,420 | 2/1963 | Kenaya | 204—159.12 |
| 3,625,845 | 12/1971 | Nakayama et al. | 204—159.12 |

WILBERT J. BRIGGS, Sr. Primary Examiner

U.S. Cl. X.R.

260—17.4 GC; 264—328, 331